United States Patent [19]

Domann et al.

[11] Patent Number: 4,816,979

[45] Date of Patent: Mar. 28, 1989

[54] CIRCUIT FOR REGULATING THE HIGH-VOLTAGE SUPPLY OF AN ELECTROSTATIC FILTER

[75] Inventors: Helmut Domann, Leonberg; Karl-Heinz Hägele, Vaihingen/Enz; Hartmann Rupp, Ludwigsburg, all of Fed. Rep. of Germany

[73] Assignee: Robert Bosch GmbH, Stuttgart, Fed. Rep. of Germany

[21] Appl. No.: 45,851

[22] PCT Filed: Apr. 30, 1986

[86] PCT No.: PCT/DE86/00178

§ 371 Date: Apr. 28, 1987

§ 102(e) Date: Apr. 28, 1987

[87] PCT Pub. No.: WO87/01306

PCT Pub. Date: Mar. 12, 1987

[30] Foreign Application Priority Data

Aug. 30, 1985 [DE] Fed. Rep. of Germany ....... 3531025

[51] Int. Cl.[4] .......... H02M 3/335

[52] U.S. Cl. .......... 363/21; 363/41; 363/97; 323/903

[58] Field of Search .......... 363/19–21, 363/41, 56, 95, 97; 323/903

[56] References Cited

U.S. PATENT DOCUMENTS

| | | | |
|---|---|---|---|
| 4,335,414 | 6/1982 | Weber | 363/21 X |
| 4,410,934 | 10/1983 | Fathauer et al. | 323/903 X |
| 4,466,051 | 8/1984 | Fitzgerald | 363/21 |
| 4,479,164 | 10/1984 | Siegel | 323/903 X |
| 4,586,120 | 4/1986 | Malik et al. | 363/21 |

*Primary Examiner*—Peter S. Wong
*Attorney, Agent, or Firm*—Michael J. Striker

[57] ABSTRACT

A circuit arrangement for regulating the high-voltage supply of an electrostatic filter for internal combustion motors whose high-voltage output stage (2) is controlled by a pulse-width modulator (3). The high-voltage output stage (2) contains a diode blocking oscillator which gives off a output voltage ($U_A$) of several kV on the output side. The pulse-duty factor of the output voltage ($U_A$) is changed as a function of the output current or the output voltage and while taking into account a maximum allowable power. The soot filter (1) can be constantly operated in an optimum operating range in this manner.

2 Claims, 3 Drawing Sheets

CIRCUIT FOR REGULATING THE HIGH-VOLTAGE SUPPLY OF AN ELECTROSTATIC FILTER

BACKGROUND OF THE INVENTION

The invention is based on a circuit arrangement according to the preamble of the main claim. Electrostatic filters are known which are used in industrial plants for separating dust particles from exhaust gases. These electrostatic filters are connected to high-voltage supplies whose voltage is regulated. The output voltage is fed to a regulator which controls the high voltage. A suitable high voltage can be produced in a simple manner for the electrostatic filters used in industrial plants by means of the available mains voltage. For an application in motor vehicles, where there is only a d.c. voltage of 12 volts, for example, as vehicle voltage, the known circuit arrangements are not suitable for the high-voltage supply of soot filters. The electrostatic filter is operated in the motor vehicle in sharply diverging areas. Throughput, composition, soot charging, moisture and temperature of the exhaust gas vary considerably within the entire speed and load ranges of the motor and change abruptly in intermittent operation of the motor. The impedance of the discharge and the breakdown limit of the discharge depend heavily on these parameters and fluctuate accordingly. The current which is fed into the filter and/or the operating voltage must be correspondingly adjusted to predetermined values in order to ensure a proper functioning of the filter in the entire motor operating range. It must be taken into consideration that the electrostatic filters in motor vehicles must be operated particularly intermittently and with throughput fluctuations of a factor of 10, whereas the known filters in large-scale plants are operated substantially steadily with a fixed operating point.

SUMMARY OF THE INVENTION

The circuit arrangement, according to the invention, with the characteristic features of the main claim, has the advantage that an optimal action of the electrostatic filter can be achieved within the entire motor operating range with this regulator. This effectiveness criterion is satisfactorily met when it is ensured within the entire performance graph of the motor operation that a determined base current $I_G$ is always fed to the electric filter. The regulating circuit can then be designed in a very simple manner as a fixed-value regulator for the filter operating current control variable. The regulation of the high-voltage supply is designed in such a way that it is first always attempted to regulate the base current at a fixed value which is constant and independent of the motor operating point or other disturbing influences to a great extent. Only in a precision optimization of the filter operation can the output current which forms the filter operating current also be controlled, in addition, as a function of the performance graph of the motor operation.

A high voltage which makes it possible to use electrostatic filters in motor vehicles can be generated from a relatively low battery d.c. voltage by means of a diode blocking oscillator. The high-voltage output stage is fed on the primary side with a pulsating voltage whose pulse-duty factor is adjusted as a function of the operating state of the soot filter. A monitoring of the output voltage, output current and output power makes it possible to change the pulse-duty factor in such a way that predetermined maximum values are not exceeded, the power elements employed are protected against destruction by means of a power limiting, and the power absorption is kept as low as possible as a whole.

The diode blocking oscillator can be arranged in multiple stages in a cascade connection in order to increase the output voltage, wherein the charging capacitor can be formed by means of the capacitance of the high-voltage cable on the output side. A special charging capacitor can accordingly be dispensed with.

The primary winding of the blocking oscillator is preferably connected in series with a field effect transistor which is operated as an electric switch, its control input (gate) being controlled by a pulse-width modulator for adjusting the pulse-duty factor. The pulse-width modulator changes the pulse-duty factor in such a way that the output current and/or the output voltage and/or the output power limits the high-voltage output stage and keeps it within a predetermined operating range. In order to monitor and limit the primary current the voltage drop of the switched on field effect transistor on the primary side can be used, since this transistor has an extensively linear internal resistance during overloading and the voltage which is dropping at it between the drain and the source is proportional to the primary current. The primary current should be limited to the highest possible value particularly in the running-up phase. However, this value must be smaller that the current which leads to the destruction of the field effect transistor. The higher the primary current during the running-up phase, the faster the output current and output voltage reach their operating values.

In addition, a breakdown recognition device and an initial break control provide that the filter is not completely switched off during the occurrence of a voltage breakdown; rather, the operating current is only reduced or limited to a minimum current as rapidly and within as short a time as possible. Accordingly, arcs occurring during breakdowns are rapidly extinguished. But a minimum operation of the filter is nevertheless maintained during the regulation point, since the particles are still charged by means of the minimum current. In order to permanently ensure the secure operation of the filter, limits are provided with respect to the maximum current which can be fed into the filter and with respect to the maximum power and voltage which can be fed into the filter. Each of these three limits protects the component parts of the high-voltage supply and the high-voltage component parts of the filter from an overload. The main power supply is additionally protected by means of the power limiting against an excessive power absorption by means of the electrostatic filter.

The cumulative feeding of the leakage current to the base current has the advantage that the momentary operating current, at least the required operating current, is fed into the filter very accurately for each motor operating point and as a function of the respective operating ability of the insulator. This has the advantage that the main power supply is loaded in each instance by means of the filter only with the minimum required electric power absorption. The electronic power component parts can accordingly be designed for lower loads. The component parts are accordingly smaller or cheaper or can be dispensed with entirely in some cases, since the maximum occurring leakage current is greater approximately by a factor of 10 than the leakage current averaged with respect to time. The cumulative feeding of the leakage current can accordingly be supplemented in a particularly simple manner, and accordingly so as to be suitable for motor vehicles, in the regulating circuit according to the invention, since the filter current is selected as a control variable rather than the operating voltage.

Advantageous developments of the invention are characterized in the subclaims.

BRIEF DESCRIPTION OF THE DRAWING

The invention is explained in more detail in the following with the aid of the drawings.

DETAILED DESCRIPTION OF THE PREFERRED EMBODIMENTS

Figure 1:
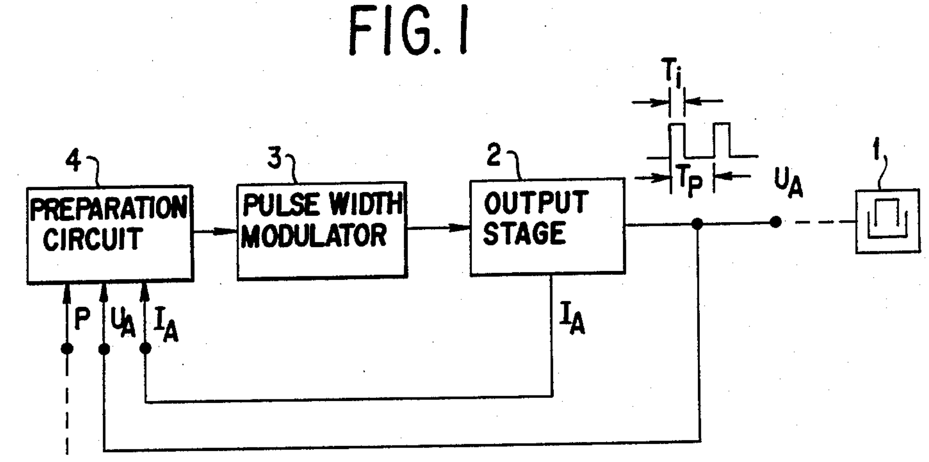
FIG. 1 shows a greatly simplified block diagram of a circuit arrangement according to the invention.

FIG. 1 shows the basic construction of a high-voltage supply for an electrostatic soot filter in the form of a greatly simplified block diagram. An electrostatic soot filter 1, whose construction is not the subject matter of the present invention, is supplied with the required high voltage by means of an output voltage $U_A$ of a high-voltage output stage 2. The pulse-duty factor $T_v$ of the output voltage $U_A$, which is defined by the ratio of the pulse duration $T_i$ to the cycle duration $T_p$, can be varied as a function of the power P, the output voltage $U_A$ and the output current $I_A$. The pulse-duty factor $T_v$ is adjusted by means of a pulse-width modulator 3, whose output is connected with the control input of the high-voltage output stage 2. The pulse-width modulator 3 is connected in turn with a preparation circuit 4 which monitors the power P, the output voltage $U_A$ and the output current $I_A$. The operation of this circuit arrangement is described in more detail with the aid of the detailed block diagram shown in FIG. 3.

Figure 2:
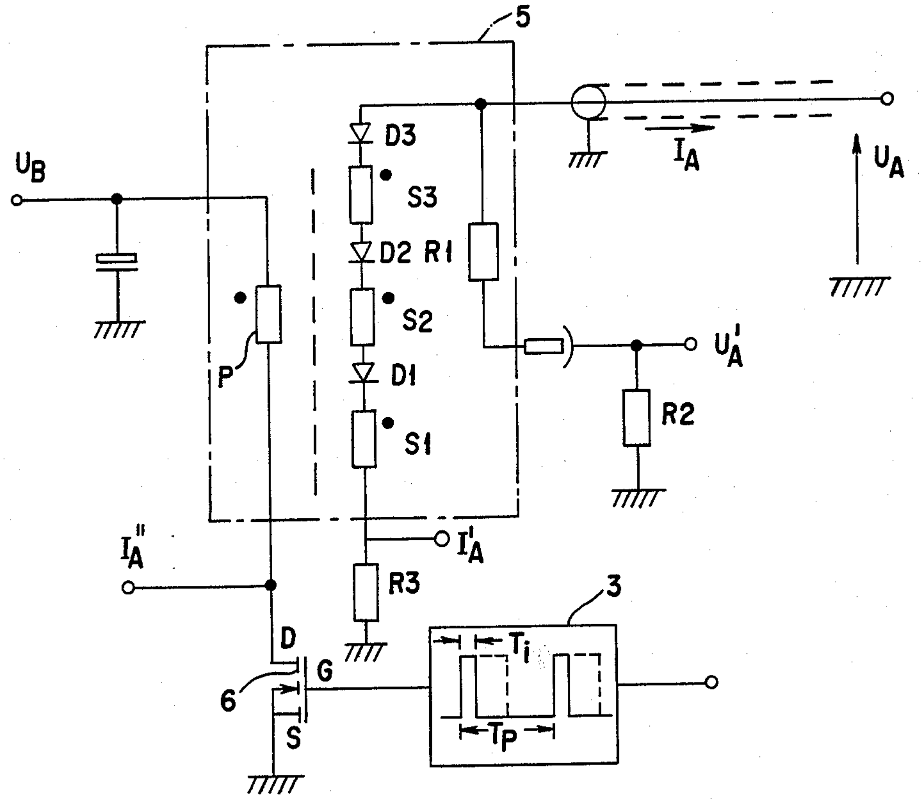
FIG. 2 shows the electric circuit of a high-voltage output stage with diode blocking oscillator.

FIG. 2 substantially shows a diode blocking oscillator 5 which transforms voltage pulses generated on the primary side into the required high voltage on the output side. The battery voltage $U_B$ is connected to the primary winding P on the one side, while the other end of the primary winding P is grounded by means of a field effect transistor 6. The field effect transistor 6 is operated as an electric switch and is periodically switched on and off at its control input G for this purpose by means of a pulse-width modulator 3. The on times and off times of the field effect transistor 6 determine the pulse-duty factor of the primary voltage and accordingly also the level of the output current $I_A$.

The secondary side of the blocking oscillator 5 consists of three secondary windings S1 to S3 and three diodes D1 to D3. A voltage $U_A'$, which is proportional to the output voltage $U_A$, can be tapped at the tap of a voltage divider which consists of resistors R1 and R2. In order to measure the output current $I_A$ a signal $I_A'$, which is proportional to the output current $I_A$, can be tapped at a resistor R3. The resistor R3 is connected in series with the secondary side of the blocking oscillator 5 for this purpose.

However, a signal $I_A''$, which is proportional to the output power $P_A$, can also be tapped at the drain connection D of the field effect transistor 6. The voltage occurring there during the on phase $T_i$ is extensively proportional to the current flowing on the primary side and accordingly also extensively proportional to the output power $P_A$ on the secondary side, since the volume resistance of the field effect transistor 6 is approximately constant between the drain and source S in transmission operation.

Figure 3:
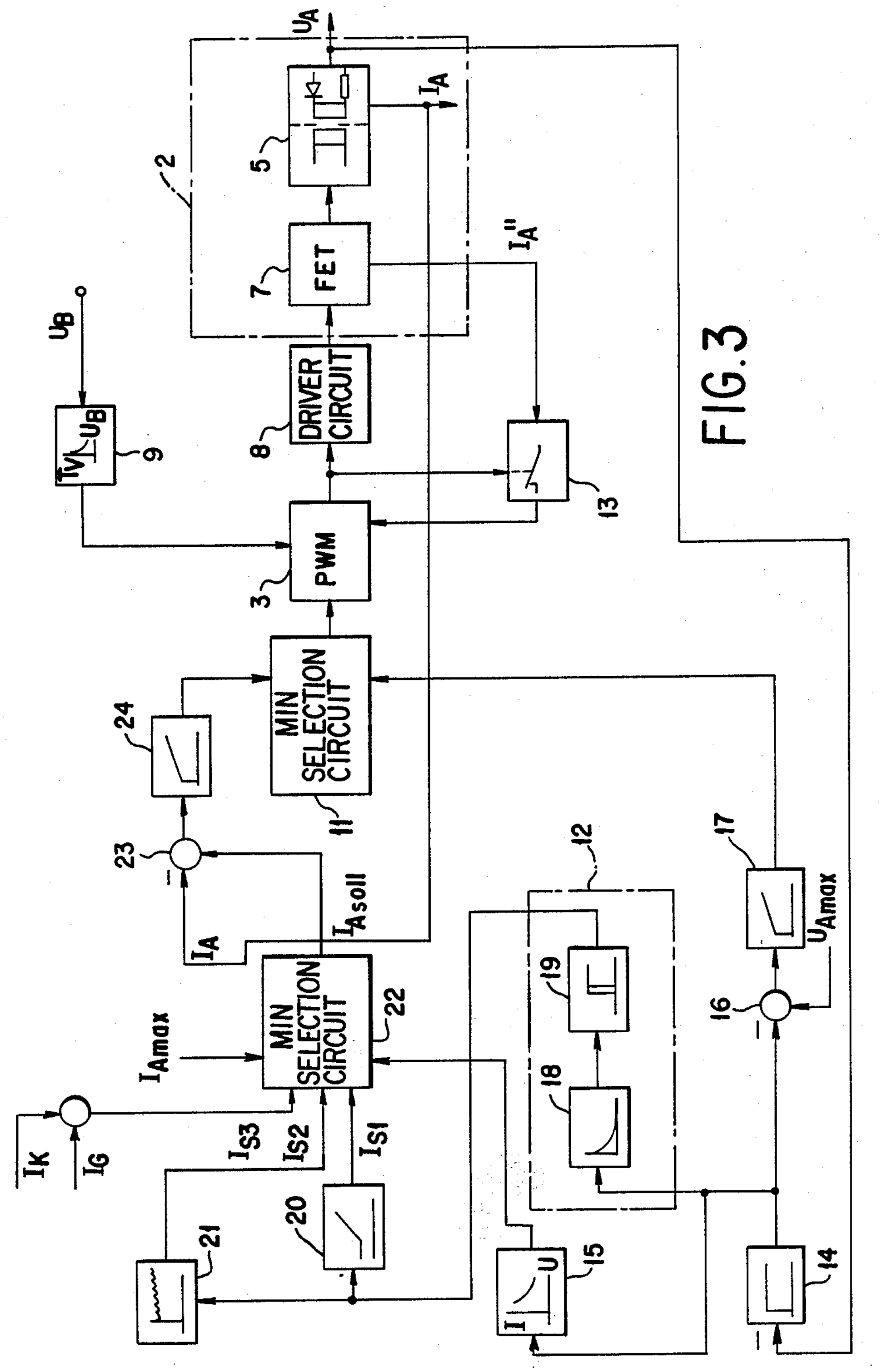
FIG. 3 shows a comprehensive block diagram of the circuit arrangement for regulating the high-voltage supply.

The block diagram shown in FIG. 3 contains a high-voltage output stage 2 which consists of a power output stage 7 and a diode blocking oscillator 5. The power output stage 7 is fed by a driver circuit 8 which is controlled in turn via a pulse-width modulator 3. The pulse-width modulator 3 adjusts the pulse-duty factor of the primary voltage at the diode blocking oscillator 5 and accordingly also the output power $P_A$ by means of the driver circuit 8, the power output stage 7. The power limiter 9 works as a function of the operating voltage $U_B$ and acts in the pulse-width modulator 3 so as to limit the pulse-duty factor. Moreover, a control signal is fed to the pulse-width modulator 3 from a minimum selection circuit 11, which control signal is a function of the output current and/or the output voltage.

In order to limit the output voltage $U_A$, this signal, or a signal which is proportional to it, is supplied to an impedance transformer 14 which is connected on the output side with the breakdown recognition circuit 12, a power limiter 15, which can be provided as an alternative to the power limiter 9, and a substraction circuit 16. Each power limiter 9 and 15 can limit the power by itself. Therefore, only one of the two power limiters is needed in a constructed circuit. The power limiter 15 receives a signal which is proportional to the output voltage $U_A$ as an input value. It converts this signal into a rated current value in such a way that the output power does not exceed a determined value. The substraction circuit 16 forms the differential between a maximum value $U_{Amax}$, which is provided for the output voltage, and the output signal of the impedance transformer 14. The difference signal is supplied to a voltage regulator 17 which is connected on the output side with the minimum value selection circuit 11.

The breakdown recognition circuit 12 consists of a differentiator 18 on the input side, a comparator 19 with hysteresis being connected downstream of the latter. The output of the breakdown recognition circuit 12 is connected with an input of an initial break control 20 and the input of an optimum point automatic means 21. By means of the initial break control 20, the output current $I_A$ is made to persist for a short time after the voltage breakdown at a value which is reduced enough so that a possible arc is extinguished. At the end of the persistence period the current is rapidly controlled so as to increase again with a defined slope. The optimum point automatic means 21 causes the output current $I_A$ to be located at a somewhat lower level after the voltage breakdown than was the case before the breakdown. The output current $I_A$ is then gradually controlled so as to increase again until a possible new breakdown. This optimum point automatic means 21 causes the number of voltage breakdowns to be kept small during operation and accordingly also the times with reduced filter operation. The outputs of the optimum point automatic means 21 and the initial break control 20, as well as the summing signal from the base current $I_G$ and the occurring leakage current $I_K$, are fed to a second minimum value selection circuit 22 on the output side. This minimum value selection circuit 22 has two additional inputs to which the maximum value of the output current $I_{Amax}$ and the output of the circuit 15 serving to limit the power are applied. The output of the minimum value selection circuit 22 is connected with the positive input of a subtractor or summator 23, an output current $I_A$, or a value proportional to the latter, being applied to its negative input. The output of the summator 23 is connected with an input of the minimum value selection circuit via a current regulator 24.

The pulse-width modulator 3 proportionally converts an analog voltage coming from the minimum value selection circuit 11 into a pulse of duration $T_i$, which is repeated at a constant rate of repetition. The minimum value selection circuit 11 selects the smallest value applied to its inputs in a manner known per se for the formation of the output signal which is supplied to the pulse-width modulator 3. A minimum value selection is effected in the minimum value selection circuit 22 in a corresponding manner. Its output signal also corresponds to the smallest input signal or is proportional to the latter.

The leakage current $I_K$ is the outgoing current at the insulator of the soot filter, while the base current $I_G$ is the current portion which flows off in the soot filter via the gas discharge. The base current $I_G$ is responsible for the functioning of the soot filter. The soot particles are charged by means of the base current $I_G$ and accordingly agglomerated. The base current $I_G$ can be determined for a filter type and set in a fixed manner or can be additionally controlled in accordance with the characteristic graph as a function of the speed and load of the internal combustion motor. In addition to the base current, the leakage current $I_K$ flowing out via the insulator must also be fed into the filter at every moment. This leakage current burns the soot deposited on the insulator and accordingly performs a cleaning action. The output current $I_A$ is limited to a maximum allowable operating value by means of the value $I_{Amax}$, which is predetermined in a fixed manner. This value can be 10 mA, for example, according to the dimensioning of the component parts.

The initial break control 20 has the object of immediately reducing the rated current value to a minimum value $I_{min}$ after a voltage breakdown. After persisting briefly at this minimum value $I_{min}$, the rated current value $I_{Asoll}$ is quickly moved ahead to the smallest rated current value. The optimum point automatic means 21 regulates the rated current value so as to be close as possible to the breakdown limit when the filter is operated in particular speed and load ranges in the vicinity of the breakdown limit. After each breakdown, the output of the initial break control 20 is quickly reduced by a determined amount and then continues to climb gradually until a renewed breakdown occurs. In case there are no breakdowns over a longer period of time, this value is equal to the sum of $I_K$ and $I_G$. In case of a voltage breakdown, the output voltage $U_A$ penetrates with a steep edge, the differential circuit 18 detects this and causes the comparator 19 to sweep after a threshold value is exceeded.

The voltage regulator 17 limits the output voltage $U_A$ to a maximum allowable value, for example, 17 to 18 kV.

Figure 4:
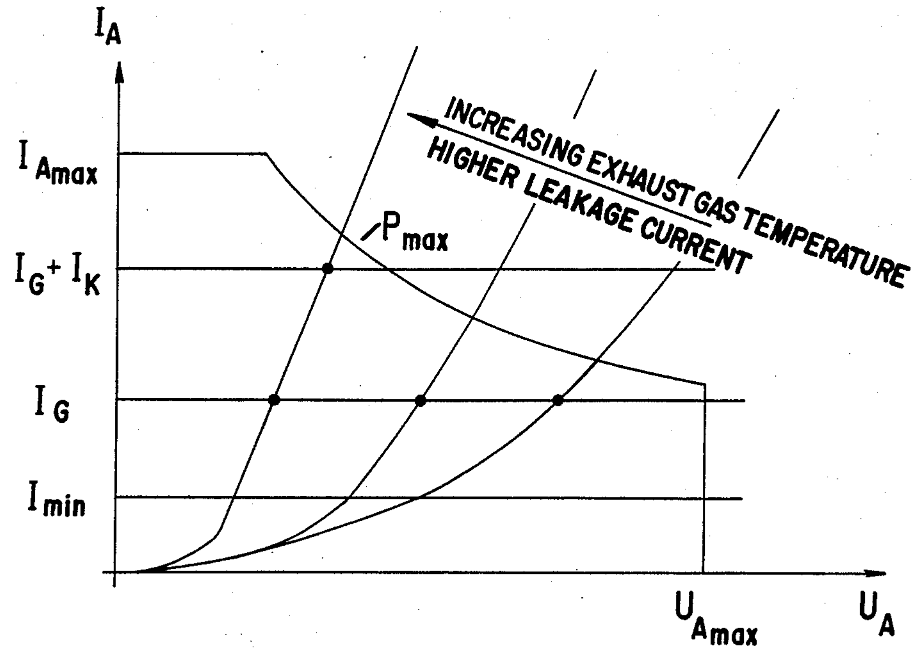
FIG. 4 shows a current-voltage diagram.

In the current-voltage diagram shown in FIG. 4, the maximum voltage, the maximum current and a power hyperbola $P_{max}$ are given. The leakage current $I_K$ increases as the exhaust gas temperature increases, so that the characteristic lines for the output current $I_A$ change accordingly. The current-voltage characteristic lines become steeper as the exhaust gas temperature increases or as the leakage current $I_K$ becomes greater.

We claim:

1. A circuit arrangement for regulating a high-voltage supply of an electrostatic filter that filters soot particles in internal combustion motors, comprising:

an output stage (2) connectable with the electrostatic filter (1) that is formed to filter soot; and a regulating circuit (4) for regulating said output stage (2) so that said output stage (2) acts as a current source, said regulating circuit (4) being formed to feed a predetermined output current from said current source into the electrostatic filter (1) so that said output current forms a regulating value for regulating said high voltage supply, said regulating circuit being formed to feed a base current ($I_G$) as part of said output current into the electrostatic filter in dependence on a characteristic performance graph of motor operation as a desired value for current regulation so as to charge and thereby agglomerate the soot particles to be filtered, said regulating circuit (4) also including a breakdown recognition circuit (12) for recognizing a voltage breakdown occurring, an initial break control circuit (20) responsive to said breakdown recognition circuit (12) to make said output current drop after said voltage breakdown occurs so that an otherwise possible arc is extinguished and to thereafter permit said output current to increase with a predetermined slope to a value of said output current just prior to said voltage breakdown, and optimum point automatic means (21) responsive to said breakdown recognition control circuit (12) for reducing a number of voltage breakdowns otherwise taking place by limiting said output current to a value which is lower than said value of said output current just prior to said voltage breakdown, said optimum point automatic means (21) being formed to allow said output current to increase again gradually thereafter.

2. The circuit arrangement as defined in claim 1, further comprising:

a blocking oscillator (5) contained in said output stage (2), said blocking oscillator (5) being formed to receive a pulsating primary voltage with a pulse-duty factor ($T_v$) that changes as a function of a respective operating state of the electrostatic filter (1).

3. The circuit arrangement as defined in claim 2, wherein said blocking oscillator (5) has a primary side and an output side, said blocking oscillator (5) being formed to transform voltage pulses generated on said primary side into a required high voltage on said output side.

4. The circuit arrangement as defined in claim 3; further comprising:

a high-voltage cable on said output side of said blocking oscillator (5), said blocking oscillator (5) being formed to use said high-voltage cable as a charging capacitor.

5. The circuit arrangement as defined in claim 2, wherein said blocking oscillator (5) is formed in multiple stages in a cascade connection.

6. The circuit arrangement as defined in claim 2, wherein said blocking oscillator (5) has a primary winding (P); further comprising:

means for grounding said primary winding (P) of said blocking oscillator and including a field effect transistor (6) electrically connected in series to said primary winding (P), said field effect transistor (6) operating as an electric switch and having a control input (G); and means for controlling said control input (G) and for adjusting said pulse-duty factor ($T_v$), said controlling and adjusting means including a pulse-width modulator (3).

7. The circuit arrangement as defined in claim 6, wherein said pulse-duty factor ($T_V$) is a ratio of a pulse duration ($T_i$) to a cycle duration ($T_p$), said diode blocking oscillator (5) having a primary side electrically connected to said field effect transistor (6), said field effect transistor (6) being formed so that a voltage drop is measureable on said primary side, said voltage drop being caused by a primary current ($I_A''$) occurring during said pulse duration ($T_i$); further comprising:

means for limiting said primary current ($I_A''$) during a running up of said output voltage ($U_A$) and including a delay circuit (13), said delay circuit being arranged so that said voltage drop returns to said pulse-width modulator (3) via said delay circuit (13).

8. The circuit arrangement as defined in claim 7, wherein said limiting means is formed to limit said primary current ($I_A$) to a value high enough to reach a specified allowable current of said field effect transistor (6) and yet not exceed said specified allowable current.

9. The circuit arrangement as defined in claim 6, wherein said output stage (2) has an output current ($I_v$), said pulse-width modulator (3) being formed to change said pulse-duty factor ($T_v$) so that said output current ($I_A$) of said output stage (2) is kept constant.

10. The circuit arrangement as defined in claim 9, wherein said output stage (2) has an output voltage ($U_A$), said output stage being formed to be effected by power limiting when said pulse-duty factor ($T_v$) changes as a function of one of said output current ($I_A$) and said output voltage ($U_A$).

11. The circuit arrangement as defined in claim 9, wherein said output stage (2) has an output voltage ($U_A$), said output stage being formed to be effected by power limiting when said pulse-duty factor ($T_v$) changes as a function of both of said output current ($I_A$) and said output voltage ($U_A$).

12. The circuit arrangement as defined in claim 6, wherein said blocking oscillator has a primary side and a secondary side, said field effect transistor (6) having a connection at said primary side, said connection being formed to exhibit a voltage drop during a pulse duration ($T_i$), said secondary side being formed to provide an output power ($P_A$), said field effect transistor (6) being formed so that said regulating circuit is fed with said voltage drop as a measurement value proportional to said output power ($P_A$).

13. The circuit arrangement as defined in claim 1, wherein said initial break control circuit is formed to guide said output current as quickly as possible to a minimum value ($I_{min}$) after an occurrence of said voltage breakdown, said initial break control circuit (20) being formed so that said minimum value ($I_{min}$) increases again at said predetermined slope to an operating current.

14. The circuit arrangement as defined in claim 1, wherein said output current ($I_A$) is formed as a sum of said base current ($I_G$) and a leakage current ($I_K$), said base current ($I_G$) constituting a predetermined current necessary for charging and thereby agglomerating the soot particles to be filtered so that the filter (1) can function, said leakage current ($I_K$) constituting an outgoing current flowing out via an insulator of the filter (1).

15. The circuit arrangement as defined in claim 1, wherein said output stage (2) has an output voltage ($U_A$) and a output power ($P_A$); further comprising:

means (11) responsive to a control signal proportional to said output voltage ($U_A$) for limiting said output power ($P_A$) and including a power limiter (15), said power limiter (15) being formed to convert said control signal into a rated current value so that said output power does not exceed a predetermined value.

16. The circuit arrangement as defined in claim 15, wherein said power limiter (15) is formed to also keep said output power constant.

17. The circuit arrangement as defined in claim 1, wherein said output stage (2) is formed to receive an operating voltage ($U_B$) and to have an output power ($P_A$); further comprising:

means for limiting said output power ($P_A$) as a function of said operating voltage ($U_B$) and including a power limiter (9).

18. The circuit arrangement as defined in claim 1, wherein said output stage (2) has an output voltage; further comprising:

means for limiting said output voltage ($U_A$) and including a voltage regulator (17), said voltage regulator (17) being formed to produce a signal proportional to said output voltage ($U_A$); and means responsive to said signal for controlling a pulse-width modulator (3) so as to prevent any further increase of said output voltage ($U_V$) and including a minimum selection circuit (11).

19. The circuit arrangement as defined in claim 14, wherein said output stage (2) is formed so that said base current ($I_G$) is additionally controllable in accordance with a characteristic graph by speed and load motor parameters.

20. The circuit arrangement as defined in claim 1; further comprising:

an electrostatic filter for filtering soot particles in the internal combustion motors, said filter being connected to said high-voltage output stage.

21. An arrangement for regulating a high-voltage supply for an electrostatic filter, comprising:

an electrostatic filter for filtering soot particles from exhaust gas in internal combustion motors, said filter having an insulator, said filter being formed so that when the exhaust gas discharges, a leakage current ($I_K$) flows out at said insulator and a base current $I_G$ flows off in said filter;

an output stage (2) connected to said filter; and regulating means (4) for regulating said high-voltage output stage (2) so that said output stage (2) acts as a current source, said current source being formed to feed an output current ($I_A$) composed of both said base current ($I_G$) and said leakage current ($I_K$), said current source being formed to feed said base current ($I_G$) into said filter so as to charge the soot particles and thereby cause the soot particles to agglomerate and thus deposit on said insulator, said current source being formed to feed said leakage current ($I_K$) into said filter so as to burn the agglomerated soot particles that are deposited on said insulator, said regulating circuit (4) also including a breakdown recognition circuit (12) for recognizing a voltage breakdown occurring, an initial break control circuit (20) responsive to said breakdown recognition circuit (12) to make said output current drop after said voltage breakdown occurs so that an otherwise possible arc is extinguished and to thereafter permit said output current to increase with a predetermined slope to a value of said output current just prior to said voltage breakdown, and optimum point automatic means (21) responsive to said breakdown recognition control circuit (12) for reducing a number of voltage breakdowns otherwise taking place by limiting said output current to a value which is lower than said value of said output current just prior to said voltage breakdown, said optimum point automatic means (21) being formed to allow said output current to increase again gradually thereafter.

* * * * *